United States Patent [19]
Schmitt et al.

[11] Patent Number: 5,692,140
[45] Date of Patent: Nov. 25, 1997

[54] METHODS AND APPARATUS FOR SYNCHRONIZING APPLICATION AND UTILITY PROGRAMS

[75] Inventors: David Cornelius Schmitt; Scott Steven Schafer, both of Novato, Calif.

[73] Assignee: Intellitools, Inc., Novato, Calif.

[21] Appl. No.: 489,589

[22] Filed: Jun. 12, 1995

[51] Int. Cl.[6] .................................................. G06F 3/14
[52] U.S. Cl. ............................................ 395/326; 395/340
[58] Field of Search .............................. 395/152, 153, 395/155, 156, 157, 158, 159, 160, 161, 163, 164, 600, 650, 700, 800, 326, 340, 341, 342, 343, 344, 345, 346, 347; 345/118, 186, 199; 364/146

[56] References Cited

U.S. PATENT DOCUMENTS

5,517,605   5/1996   Wolf ..................................... 395/155

*Primary Examiner*—Thomas G. Black
*Assistant Examiner*—Ruay Lian Ho
*Attorney, Agent, or Firm*—H. Michael Brucker

[57] ABSTRACT

Methods and apparatus for changing sets of configured operational features in a utility program based upon changing screen images in a currently active application program.

16 Claims, 12 Drawing Sheets

| WATCHSPOT X | WATCHSPOT Y | INDEX | BIT DEPTH |
|---|---|---|---|
| SET NAME$_1$ | VALUE$_1$ | PICTURE$_1$ | |
| SET NAME$_2$ | VALUE$_2$ | PICTURE$_2$ | |
| SET NAME$_3$ | VALUE$_3$ | PICTURE$_3$ | |
| ⋮ | ⋮ | ⋮ | |
| SET NAME$_N$ | VALUE$_N$ | PICTURE$_N$ | |

FIG._5a

| 320 | 460 | TLS | 8 |
|---|---|---|---|
| ELEPHANT | 165239 | | |
| CAT | 265388 | | |
| ⋮ | ⋮ | ⋮ | |

METHODS AND APPARATUS FOR SYNCHRONIZING APPLICATION AND UTILITY PROGRAMS

FIELD OF THE INVENTION

The present invention relates to the field of utility programs for computer systems, and more specifically, to a utility program that changes sets of configured operational features based on changes in the image on a video output (a computer screen).

THE PRIOR ART

Once computers were used largely by programmers, who would create programs to meet their own particular needs. Today, computers are most commonly used by people who do not know how to write their own programs. Instead, they use programs known as application programs that are created by programmers to meet the needs of a general user. Examples of application programs include word processors, spreadsheets, and educational programs for children.

Though application programs are written to meet the needs of a wide variety of users, some users still desire to customize the operation of the application program to better meet their own specific needs. This has resulted in the development of another category of programs known as utility programs. A utility program runs at the same time as the application program and changes the user's interaction with the application program, allowing the user to tailor the operation of the general application program to meet his needs.

For example, a utility program could automatically expand abbreviations as a user types in a word processor for the purpose of increasing typing speed. A different utility program could provide an alternative input method for a disabled computer user who cannot use the standard input methods of keyboard and mouse. Another example is a utility program that could change the look and feel of the application program for the sole purpose of providing aesthetic pleasure to the user. Utility programs have various operational features that can be configured for a particular user's needs. In the previously-listed examples, these operational features would include the abbreviations known to the utility program, the access adaptations necessary for the user, or the colors and other changes made to the user interface.

It is often beneficial for the utility program to maintain different sets of configured operational features with one or more methods provided to switch between the various sets. The goal of the present invention is to provide a better method for switching sets of configured operational features.

Three methods have been used in the prior art to change sets of configured operational features. The most commonly used method is to change sets automatically when the active application program changes. A second method is to allow the user to choose a new set from a menu of sets. The third and least commonly used method is known as branching. When using branching, activation of a predetermined function of the utility program causes the utility program to change to a new set of configured operational features.

A problem with the solutions provided by the prior art is apparent when considering their application to "point-and-click" application programs as typified by state-of-the-art elementary educational programs such as Brøderbund's Living Books series or Edmark's House series. These programs present the user with different screen images for different activities within the program. Children interact with these screen images by moving the mouse and clicking on pictures on the screen using the mouse button. (Clicking is defined as pressing and releasing the mouse button while the cursor is over a particular screen location.)

When a point-and-click application program determines that the user has clicked on an area of the screen, it determines which area of the screen was clicked on and performs an action corresponding to that area. This action may be to display an animation sequence, to quit the program, or to redraw the screen with a new image and internally reconfigure itself to respond to mouse clicks as appropriate to the new image. Additionally, the program may choose to ignore the mouse click, such as during a lengthy animation that cannot be interrupted.

To illustrate the problem with the prior art solutions, consider the example of a utility program providing access for someone with a disability who cannot use a mouse. This utility program would provide access to the point-and-click type of educational application program by providing an alternative method of selecting the active spots on the screen image ("hot spots"). To do so, the utility program would use a table of the hot spots, in which each hot spot would correspond to the location on the screen image that was a clickable item. For this particular access utility program, a set of configured operational features is defined as a single table of hot spots. For effective operation, the utility program would use a different table of hot spots for each different screen image.

The shortcoming of the prior art solutions manifests when a hot spot is selected that changes the screen image and the utility program needs to change to a different set of configured operational features (a different table of hot spots). The application program hasn't changed, so the prior art method of changing sets when the active application program changes fails to operate effectively. The user in this example may be a young child not capable of choosing a new set of hot spots, or finds such additional selections cumbersome, so the prior art method of allowing the user to select a set also fails to operate effectively. Branching comes closer to operating effectively in this situation but still falls short. Branching operates as follows: any hot spot which changes the screen image would be configured when clicked to change the table of hot spots to correspond to the new screen image. When the user uses the utility program to select a hot spot that changes the screen image, the screen image changes, and the utility program begins using the table of hot spots corresponding to the new screen image.

However, branching can fail in several circumstances. For example, the utility program will not know to branch if a standard mouse is used to click on the hot spot, which occurs with regularity when two people are interacting with the same program. When this occurs, the utility program is still using the set of configured operational features for the previous screen image, rather than the set for the current screen image. Alternatively, the application program may ignore the mouse click when the branching hot spot is activated, in which case branching still takes place but the screen image doesn't change. In either case, the utility program will no longer operate correctly and is said to be "out of sync" with the application program.

It would be desirable if the proper set of configured operational features was always active when the user was using a particular screen image in an application program. The user would not need to change sets manually, nor would there be a danger of the utility program getting out of sync with the application program.

SUMMARY OF THE INVENTION

It is therefore an object of the present invention to provide methods and apparatus for changing sets of configured operational features in a utility program based upon changing screen images in a currently active application program.

According to the present invention, an identifiable characteristic of each screen image in the application program is associated with a set of configured operational features of the utility program. When the screen image changes in the application program, the utility program is able to recognize the new screen image and on the basis of the recognized image to determine and implement the appropriate set of configured operational features for that screen image.

The procedure of watching the screen to detect screen changes calling for a new operational feature set is sometimes referred to herein for convenience as "screen watch". The portion of the screen so watched is sometimes referred to herein for convenience as the "watch spot".

One use of the present invention allows access to educational programs by children with disabilities. To meet this purpose, the preferred embodiment of the current invention will change sets of hot spots as a result of screen image changes. However, it will be readily apparent to one skilled in the art that the present invention is useful with any type of utility program and its particular operational features, as well as with any type of application program. For example, a business user might benefit from a utility program providing different shortcuts for different screens in a database application program.

BRIEF DESCRIPTION OF THE DRAWINGS

The accompanying drawings illustrate one embodiment of the invention and, together with the description, explain principles of the invention.

DETAILED DESCRIPTION OF THE INVENTION

Figure 1:
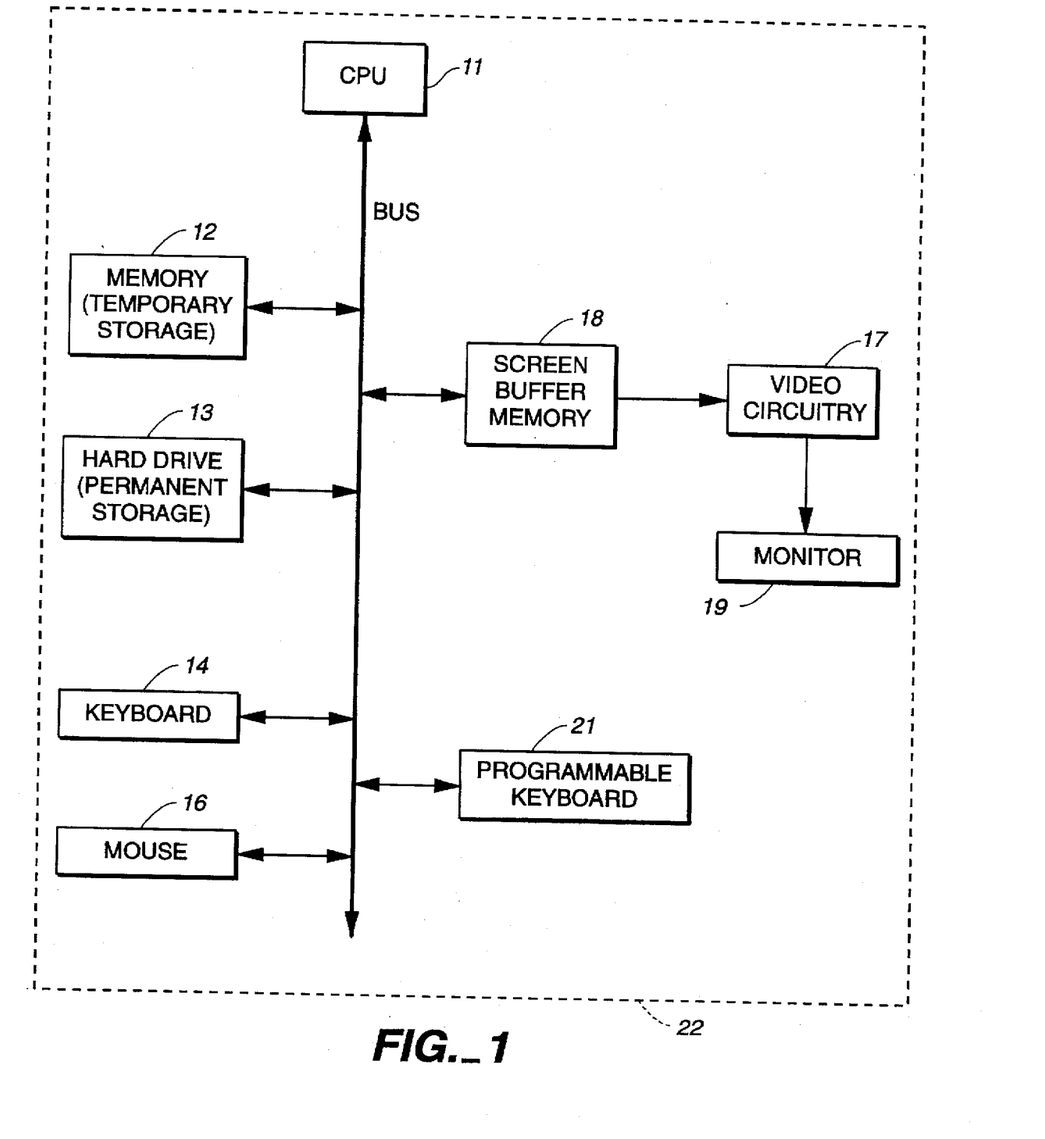
FIG. 1 is a block diagram showing relevant portions of a typical computer system.

Referring to FIG. 1, the preferred embodiment of the present invention is encompassed by several routines which are part of a utility program created for a computer system 22. These routines are stored in the computer system's memory 12 as part of the utility program and are executed by the computer system's CPU 11. The present invention is best understood through an understanding of the operation of these routines.

The present invention involves the interaction of the routines in the utility program with an application program. A utility program typically operates in two modes. In a background mode, it may perform various tasks that do not affect the timing or progression of the active application program but may provide enhancements to the user, such as expanding abbreviations typed in from the keyboard 14 or providing additional input methods to the active application program.

In a foreground mode, the utility program allows the user to interact solely with the utility program in order to adjust its operation through a configuration mode. Persons skilled in the art will understand that these two modes can be implemented in a true multitasking environment, or in an environment in which the operating system is modified by the utility program.

Explanation of the operation of the present invention is best presented by referencing a particular application program as an example. The example to be used here and in the accompanying drawings will be the hypothetical children's point-and-click educational program illustrated in FIG. 2. However, one skilled in the art will see that the present invention applies equally to any application program.

Figure 2:
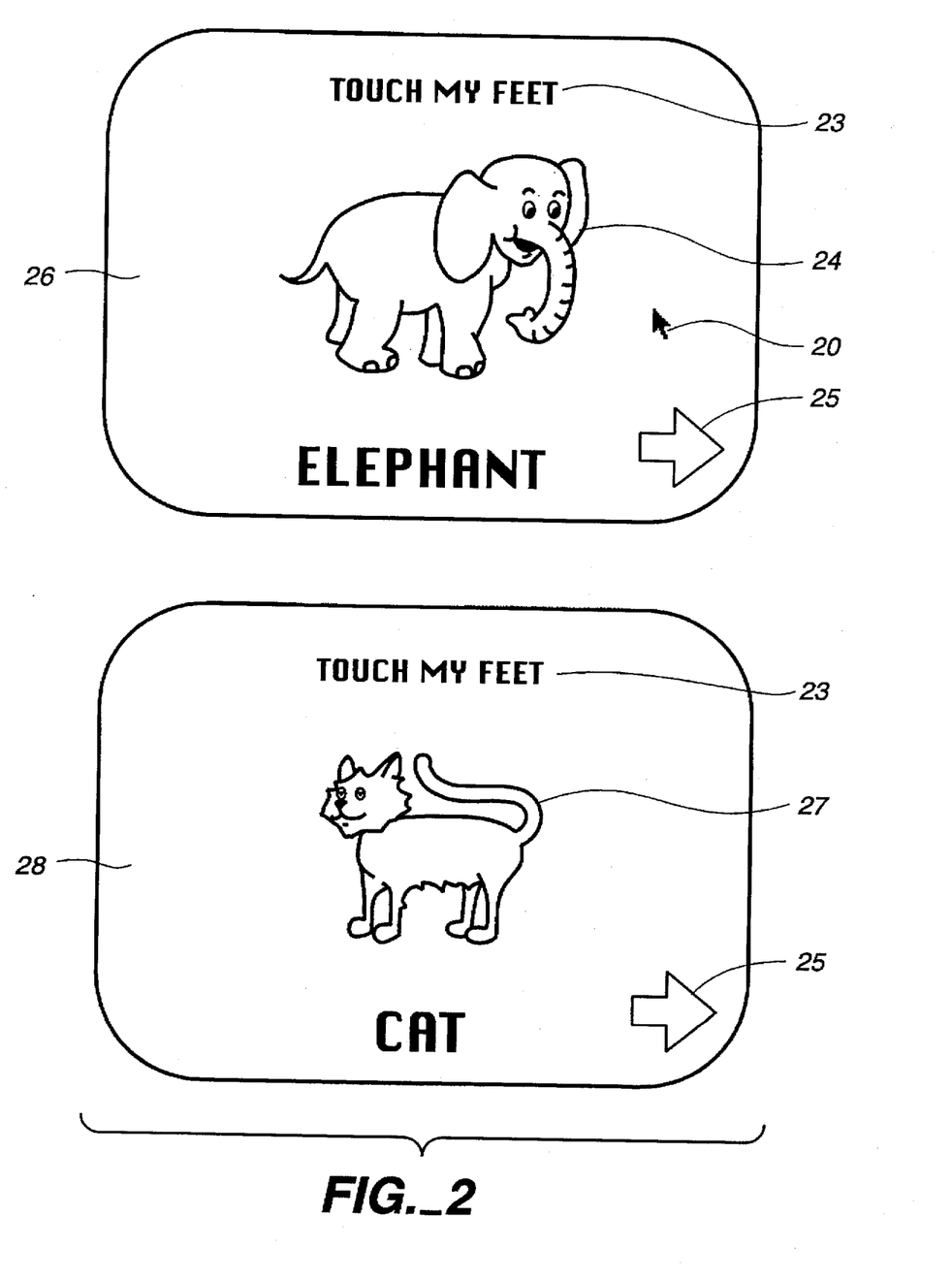
FIG. 2 illustrates screen images from a hypothetical children's educational program.

Referring to FIGS. 1 and 2, the purpose of the sample application program is to allow children to identify the body parts of a variety of animals. It operates as follows: a particular screen image 26 displays the picture of an elephant 24. One of four questions 23 appear on the screen image in succession. The questions are "Touch my nose", "Touch my feet", "Touch my ears" and "Touch my tail". The user who can operate a mouse 16 responds to the question by using the mouse to move a cursor 20, then clicking. The program responds with phrases such as "Good job" or "Try again".

At the bottom of the screen image is a picture of an arrow 25. Clicking on the picture of the arrow advances to a screen image 28 displaying a picture of a cat 27. The same four questions are then asked again by the computer. The hypothetical application program will also automatically advance to the next screen image after all four questions are answered correctly. With continued use, the application program will progress through a plurality of screens displaying pictures of different animals.

For clarity of presentation, the description of the preferred embodiment of the present invention is divided into three sections. The first section describes the process whereby the utility program changes sets as the screen image changes. The second section describes the process of configuring the utility program to change sets as the screen image changes. The third section describes additional procedures necessary for effective operation of the present invention.

The Process of Changing Sets

Figure 3A:
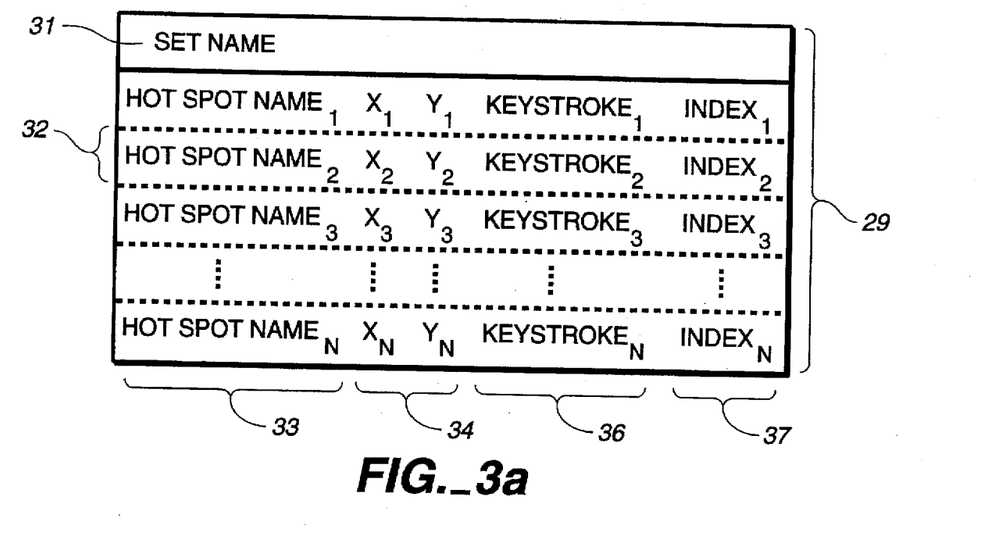
FIGS. 3(a) and 3(b) are representations of hot spot data tables.
Figure 3B:
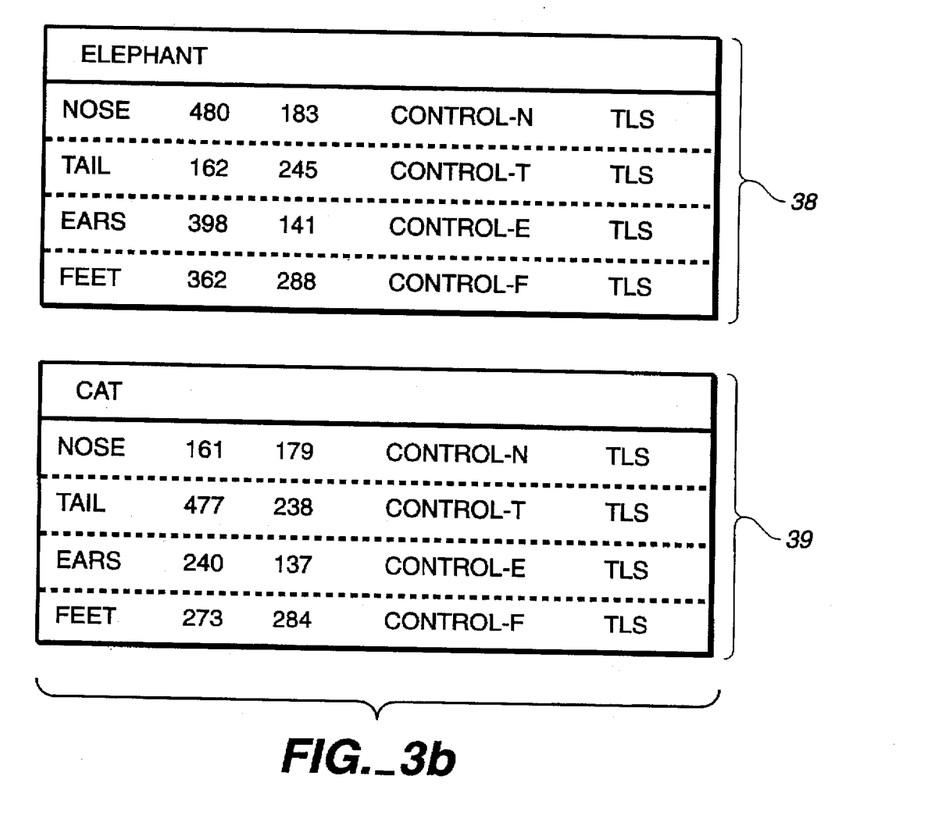

The presently preferred embodiment of the invention is a utility program for persons with disabilities designed to provide alternative access methods to application programs. It does so by maintaining a data table of the hot spots for each adapted screen image. As shown in FIG. 3a, hot spot data table 29 consists of the name 31 of the table of hot spots (the "set name"), then a series of entries 32 each containing the name 33 of a hot spot, the x and y coordinates 34 of the hot spot, and a keystroke equivalent 36 for the hot spot. (Each entry also contains an index value 37 that is not essential for the understanding of the present invention. The function of said index value is not described here but will be described below.) FIG. 3b illustrates two sample hot spot data tables 38 and 39 for the hypothetical application program described previously.

The present invention allows the user to access the hot spots of a screen image in one of two ways. First, any time the keystroke equivalent 36 of a hot spot is typed, the present invention moves the computer cursor to the x and y coordinates 34 of that hot spot and then simulates a mouse click at that location. This keystroke equivalent is commonly embedded in a programmable keyboard 21 (FIG. 1), so the user touches a picture on the programmable keyboard and the utility program clicks on the appropriate location of the screen of the application program.

The other access method provided by the present invention is scanning. When using this access method, the user presses a designated key on the keyboard 14 and the utility program begins moving the cursor on the screen from hot spot to hot spot at predetermined intervals of time. When the designated key is pressed again, the cursor stops moving and the utility program clicks at the current cursor location.

The present invention maintains files known as application access files for the individual application programs that have been adapted for use with the present invention. These application access files are stored on the computer system's hard drive 13 or other permanent storage mechanism in an area accessible to the utility program of the present invention. The name of the application access file corresponds to the name of the adapted application program, allowing it to be loaded by the utility program when an application program with a matching name commences operation.

Figure 4:
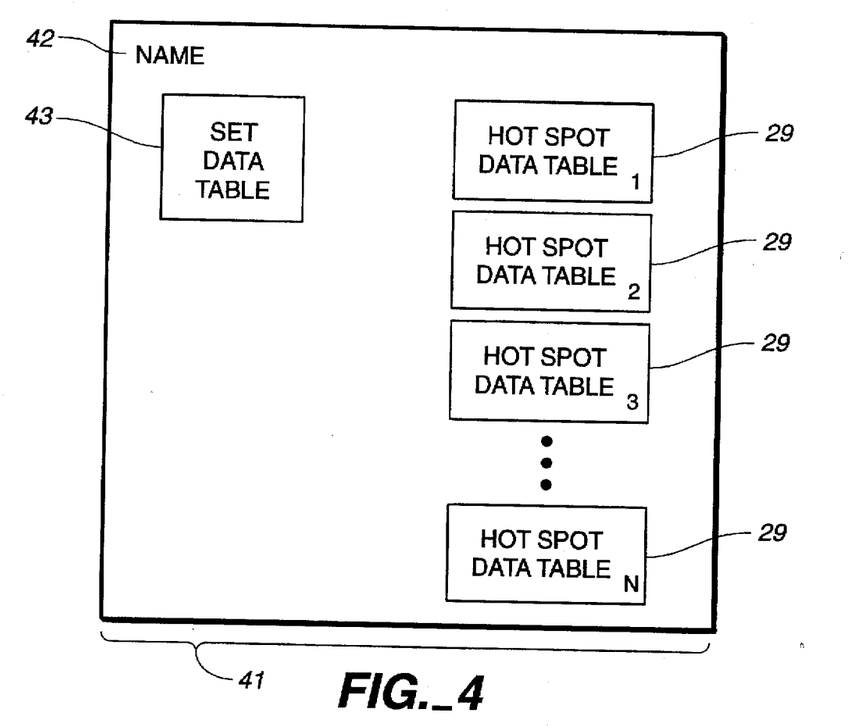
FIG. 4 is a representation of an application access file.
Figure 5A:
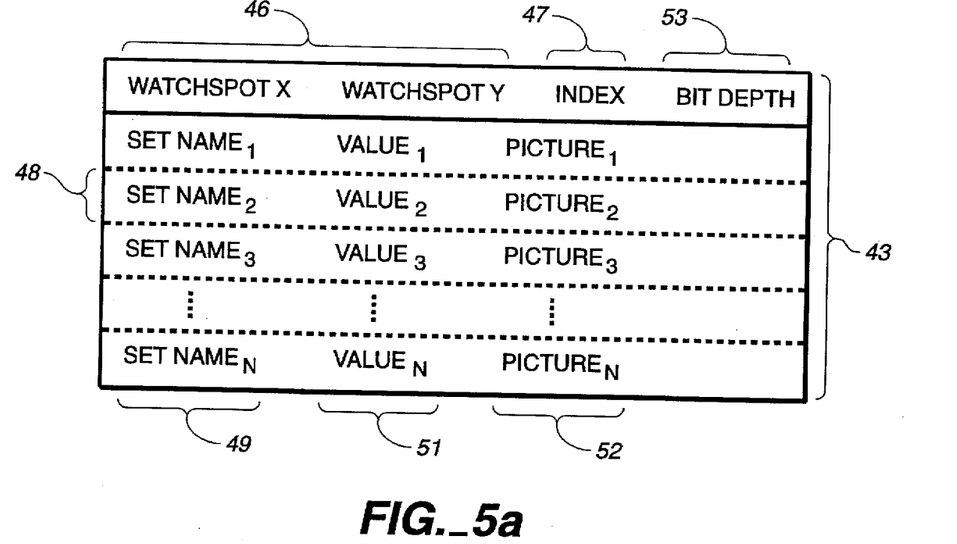
FIGS. 5(a) and 5(b) are representations of set data tables.
Figure 5B:
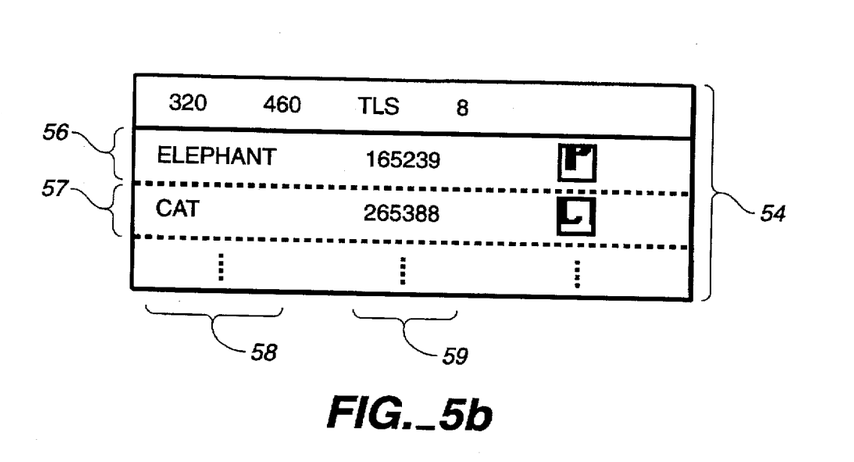

As shown in FIG. 4, each application access file consists of a name 42, a variable number of hot spot data tables 29 and typically a single set data table 43. As shown in FIG. 5a, the set data table consists of the watch spot location 46 followed by a series of entries 48 each containing a set name 49, a screen watch value 51, and a picture 52. (The set data table also contains an index value 47 and a bit depth value 53 that are not essential for the understanding of the present invention. The function of these values is described below.) FIG. 5b illustrates a sample set data table 54 for the hypothetical application program described previously.

When an application program commences operation, the utility program of the present invention attempts to load the corresponding application access file and, if the application access file is found, initially uses the first table of hot spots in that file. It also begins monitoring a small predetermined region of the screen image (the watch spot). To do this, it makes use of a portion (1% or less is acceptable) of the computer's memory known as screen buffer memory 18 (FIG. 1). Screen buffer memory 18 is an area of memory in the computer system 22 containing a direct representation of the current screen image that is used by the video circuitry 17 of the computer to refresh the monitor 19 at regular intervals.

Figure 6:
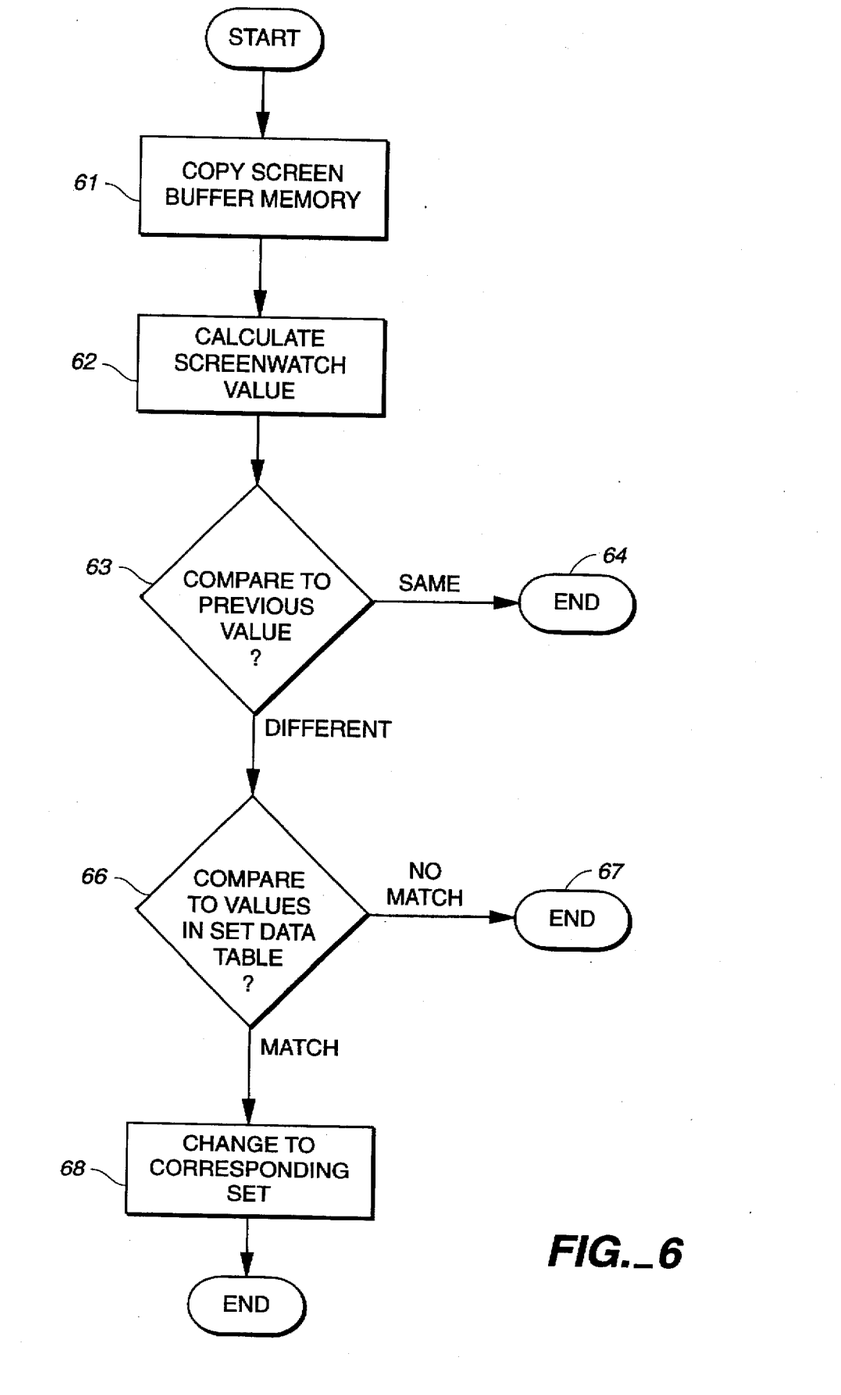
FIG. 6 is a flowchart showing the operation of changing operational sets.

As detailed in the flowchart in FIG. 6, the present invention periodically, at regular and frequent intervals (more than once a second), copies the region of screen buffer memory 18 that corresponds to the watch spot into the area of memory 12 assigned to the utility program of the present invention (Step 61). It then performs a series of mathematical calculations on this block of memory, obtaining a single arbitrary value (Step 62). This value is referred to as the current screen watch value. The mathematical calculations performed are such that a block of memory representing a particular screen image will always generate the same screen watch value, and that a different screen image will with extremely high probability generate a different screen watch value. This type of mathematical operation is commonly referred to as "hashing" and is well known in the art.

The present invention compares the current screen watch value with the last calculated screen watch value (Step 63). If the values are identical, the present invention does not change sets because the screen image hasn't changed (Step 64). If the screen watch values are not identical, the screen image has changed and the present invention continues the process of analyzing the screen watch value.

Each set name 49 (FIG. 5a) in the set data table 43 has a screen watch value 51 associated with it. Since the screen image has changed, the present invention compares the current screen watch value with the values stored in the set data table (Step 66). If the current value matches a stored value, the utility program of the present invention immediately begins using the corresponding hot spot data table (Step 68). If the current value doesn't match any of the stored values, the utility program continues to use the current hot spot data table (Step 67).

Figure 7:
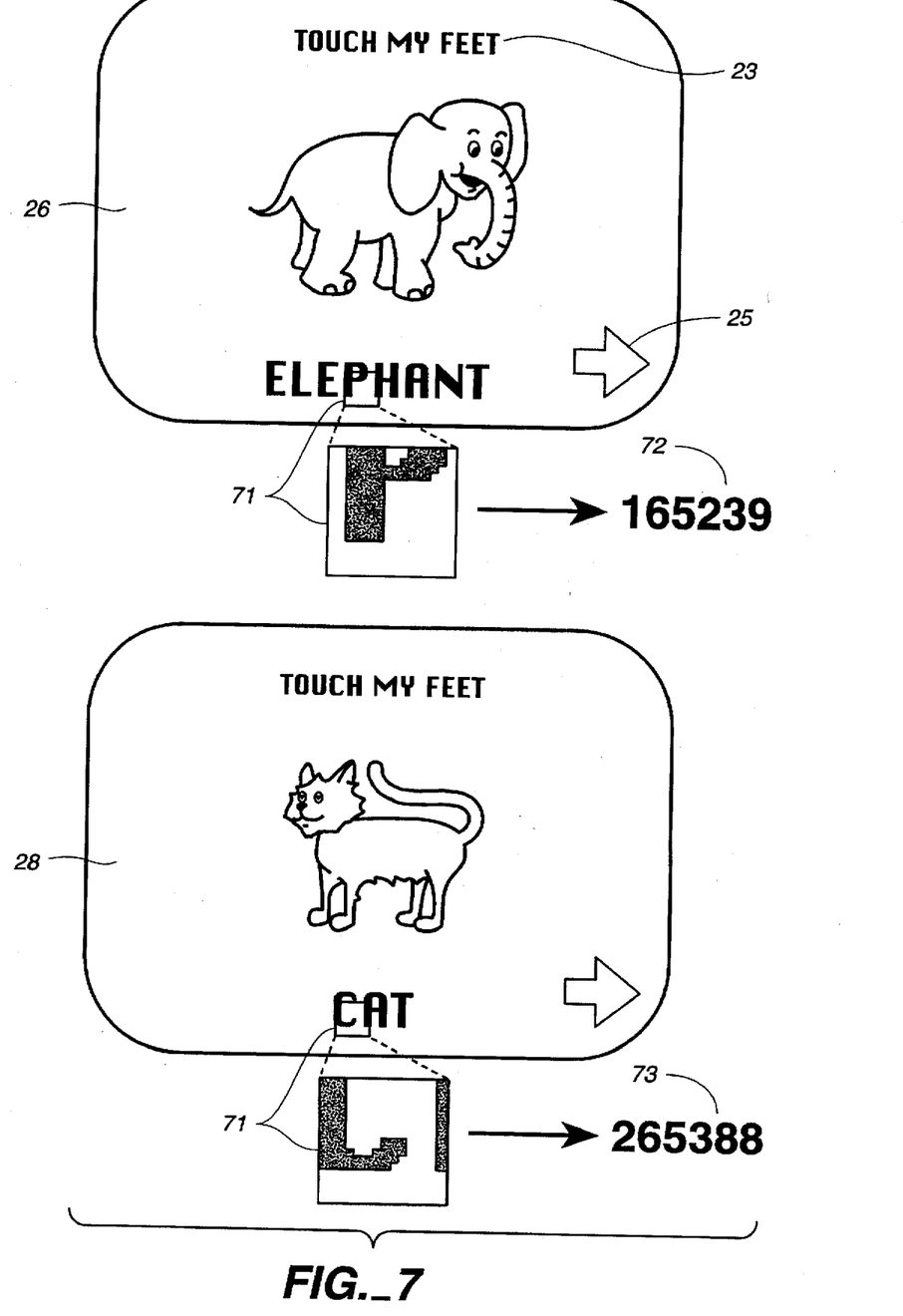
FIG. 7 is an illustration of the process of obtaining a screen watch value.

Explaining this in terms of the hypothetical educational program detailed above, begin with the situation in which the user is working on the elephant screen 26 (FIG. 2a). As shown in FIG. 7, the watch spot 71 is located near the bottom of the screen image. The utility program of the present invention is regularly copying the region of the screen buffer memory corresponding to the watch spot location into its own memory and calculating a screen watch value 72. It compares this value with the last calculated screen watch value and, as long as the screen watch value remains constant, continues to use the current hot spot data table 38 (FIG. 3b).

At some point in time, the application program changes to the cat screen 28, either because the user clicks on the arrow 25 or because the user has answered all four questions 23 correctly. When the present invention next copies from the screen buffer memory and calculates a screen watch value 73, it compares that value to the last calculated value and determines that the values are different. Next, the utility program compares the new screen watch value 73 to the values 59 stored in the set data table 54 (FIG. 5b) and finds a match. It then reads the set name 58 from the table entry 57 that contains the matching screen watch value 59, and begins to use the hot spot data table 39 with that set name (FIG. 3b).

The Process of Assigning Screen Watch Values to Sets

In configuration mode, a user of the computer system can operate the utility program of the present invention to create hot spot data tables for each screen image of an application program to be adapted for use with the present invention. The creation of hot spot data tables is a common practice in utility programs providing alternative access to hot spots. The actual process of creating such hot spot data tables is not essential to the understanding of the present invention and will not be described in detail. However, such process will be readily apparent to those skilled in the art.

Referring to FIGS. 4 and 5, when an application access file 41 is created, the utility program of the present invention also creates a set data table 43 within the application access file 41. The utility program then creates an entry 48 in the set data table 43 containing the name 49 of each hot spot data table 29 as that hot spot data table is created by the user.

Once at least two hot spot data tables are created, the user is ready to configure the sets so they will automatically change as the screen image changes. The user does this by assigning a screen watch value to each set. The detailed process of assigning the screen watch value to an entry in the set data table is illustrated by the flowchart in FIG. 8.

Figure 9:
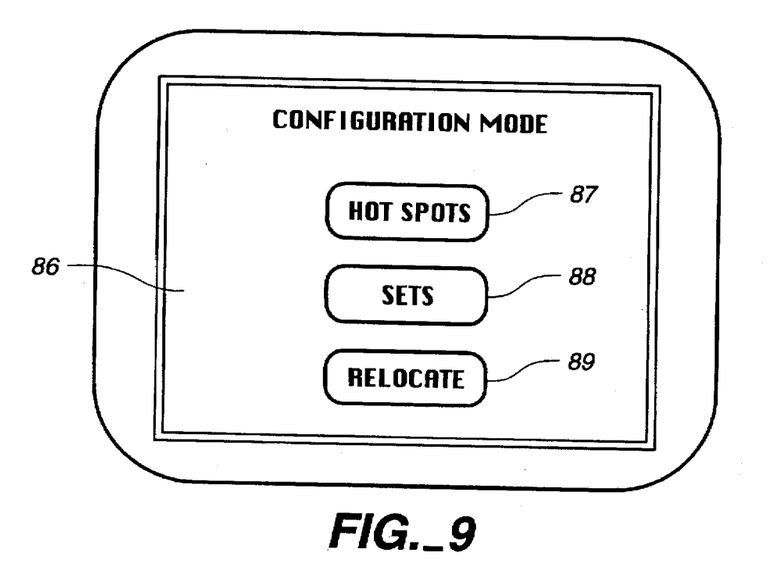
FIG. 9 is an illustration of the configuration dialog box.
Figure 10A:
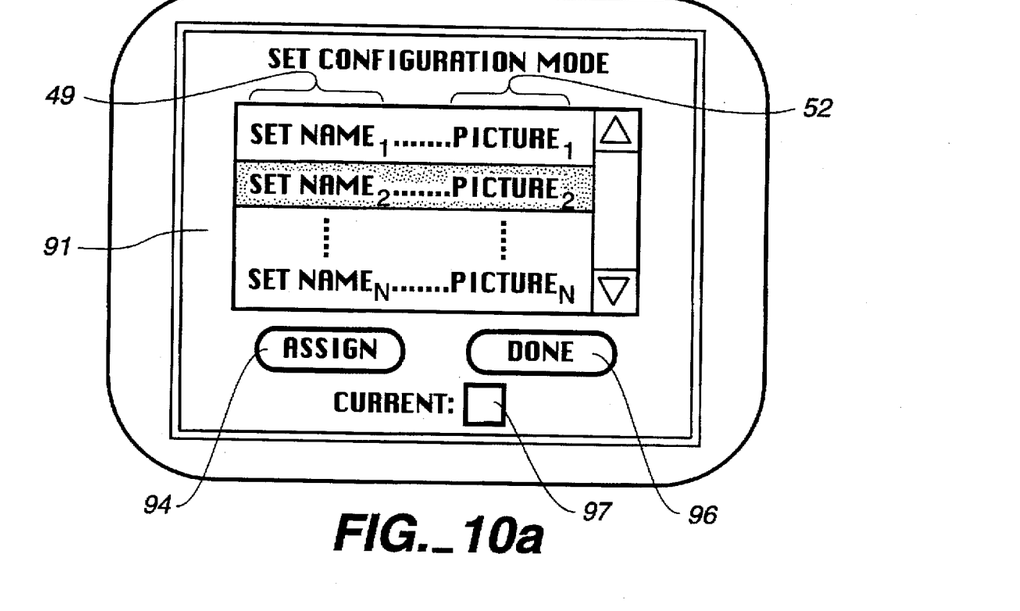
FIG. 10 is an illustration of the set configuration dialog box.
Figure 10B:
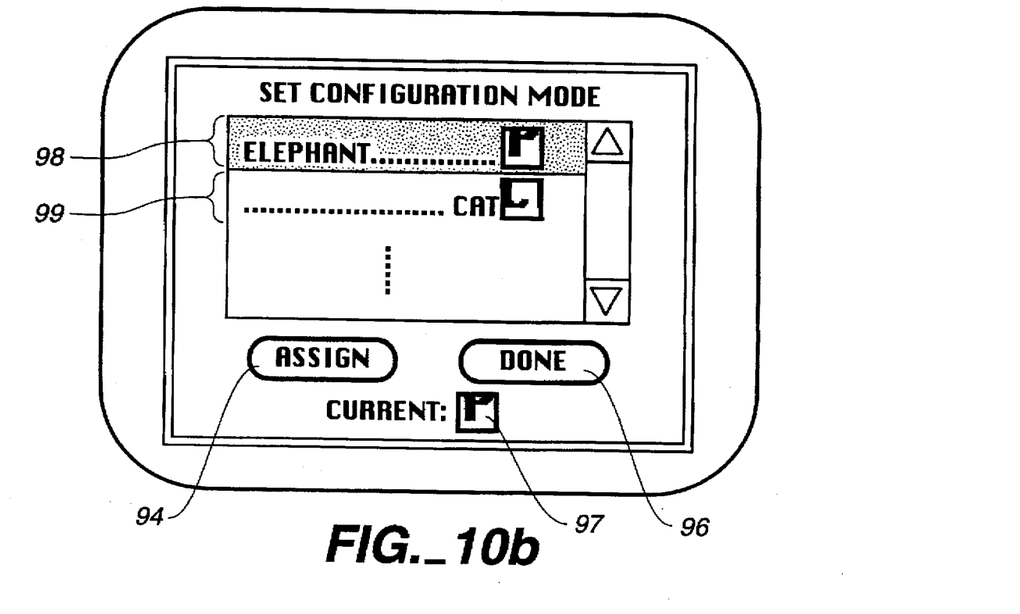

To begin the process, the application program is operated until it displays the screen image to associate with a particular set. A predetermined keyboard key combination is then pressed which causes the utility program of the present invention to enter configuration mode (Step 74), displaying the dialog box 86 shown in FIG. 9. "Sets" 88 is chosen from this dialog box and the "set configuration" dialog box 91 shown in FIG. 10a is displayed (Step 76).

The "set configuration" dialog box contains a list of set names 49 in the current application access file. The set to be used with the current screen image of the application program is clicked on, then "Assign" 94 is clicked on. This causes the utility program of the present invention to copy the region of screen buffer memory corresponding to the watch spot into the memory used by the utility program. It then uses the appropriate mathematical calculations to obtain a screen watch value (Step 78).

Figure 8:
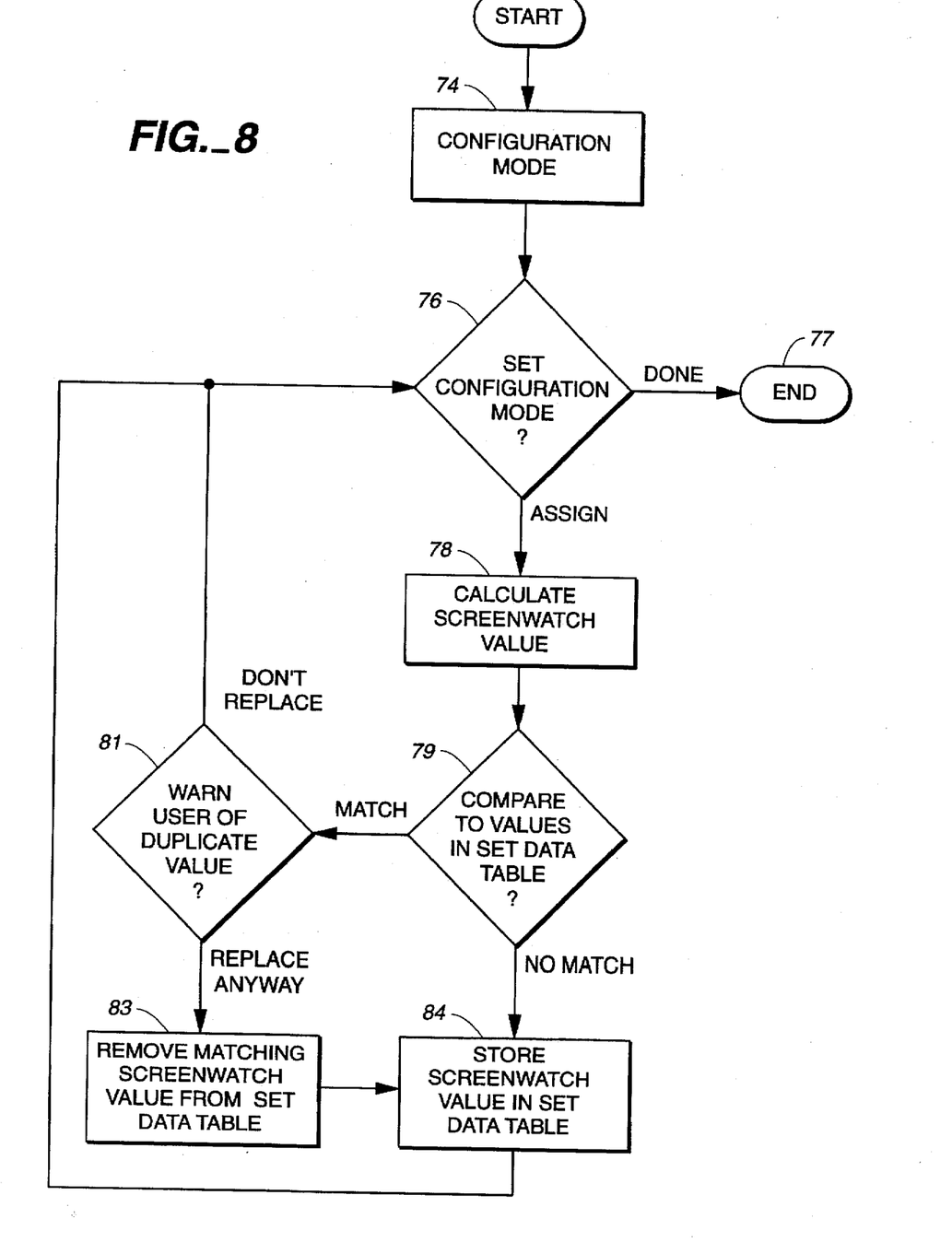
FIG. 8 is a flowchart showing the operation of assigning screen watch values to operational sets.

In order for the set-changing process to work properly, no two sets may have the same screen watch value assigned to them. In order to accommodate this need, the utility program of the present invention next compares the calculated screen watch value with all other stored screen watch values (Step 79). If there is no match, the utility program stores the calculated value in the set data table in the entry for the currently selected set (Step 84). If there is a match, the utility program alerts the user as to the conflict (Step 81). The user may choose to remove the value from the other set (Step 83) and assign the screen watch value to the current set (Step 84), or the user may choose to cancel the assignment process and leave the value assigned to the original set.

When done assigning a screen watch value to a set, "Done" 96 is clicked to exit configuration mode (Step 77). For each screen image to be associated with a particular set, the process detailed in FIG. 8 is performed.

In terms of the hypothetical educational program detailed above, with the hot spot data tables 38 and 39 already created for both the elephant screen 26 and cat screen 28, the user viewing the elephant screen 26, would press a predetermined key to enter configuration mode, then click on "Sets" 88 to enter set configuration mode. The user would select the set named elephant 98, then click on "Assign" 94. This would cause the screen watch value 72 to be calculated for the current screen image 26 and that value would be stored in the set data table 54 in the entry for the elephant set 56.

The user would next click on "Done" 96, then click on the arrow 25 to move to the cat screen 28. The user would once again enter set configuration mode. This time the user would select the set named cat 99, then click on "Assign" 94. This would cause the screen watch value 73 to be calculated for the new screen image 28 and that value would be stored in the set data table 54 in the entry for the cat set 57.

Other Procedures Necessary for Effective Operation

Figure 13:
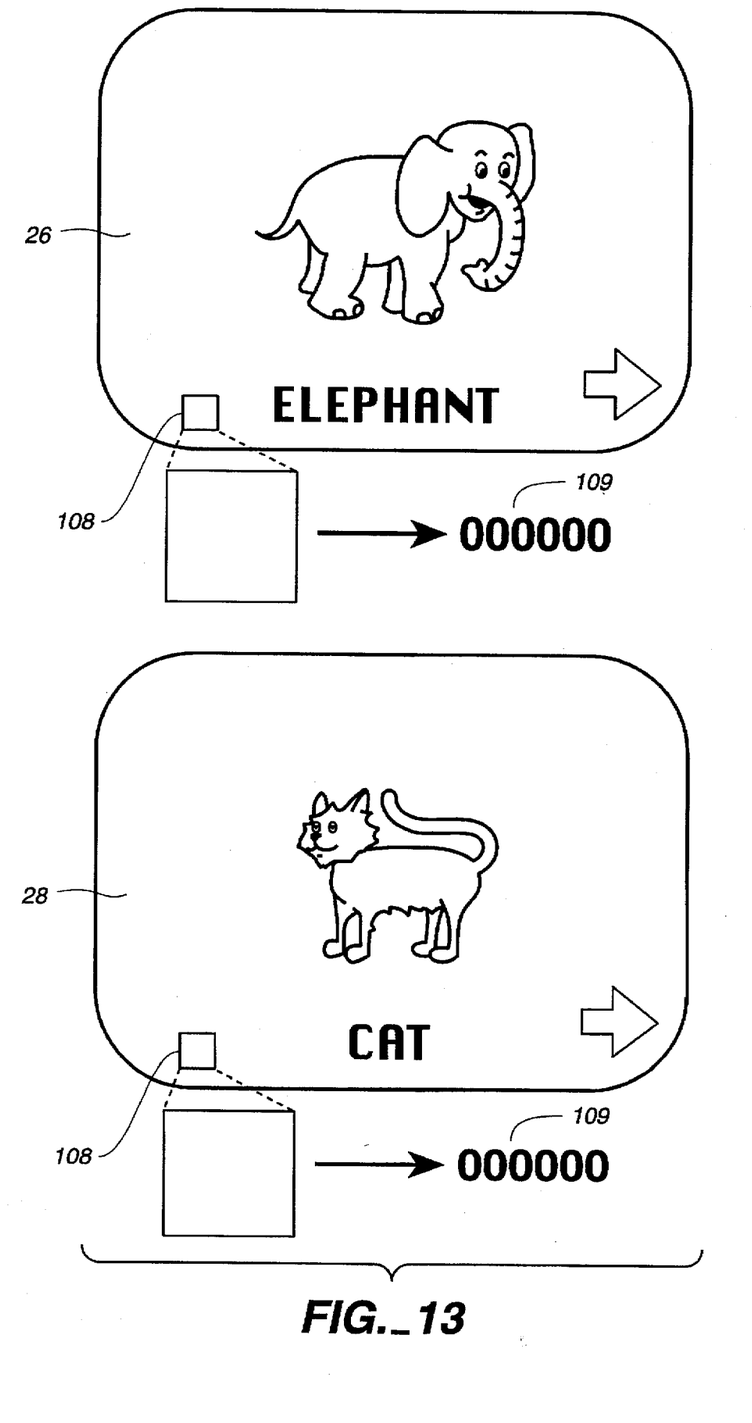
FIG. 13 is an illustration showing an ineffective screen location for deriving a screen value.

It is recognized that the technique described in the preferred embodiment will only be effective for certain locations of the watch spot. For effective use, the watch spot needs to be in a location which has a screen image that remains constant while the desired hot spots locations remain constant, yet changes when the desired hot spots locations change. For example, as shown in FIG. 7, the watch spot is effective in the sample program if located over the letters naming the animal. However, as shown in FIG. 13, the watch spot would not be effective if located in the white space to the left of the animal name because the image 108 in this particular region is identical in the different screen images 26 and 28, resulting in identical screen watch values 109.

Figure 11:
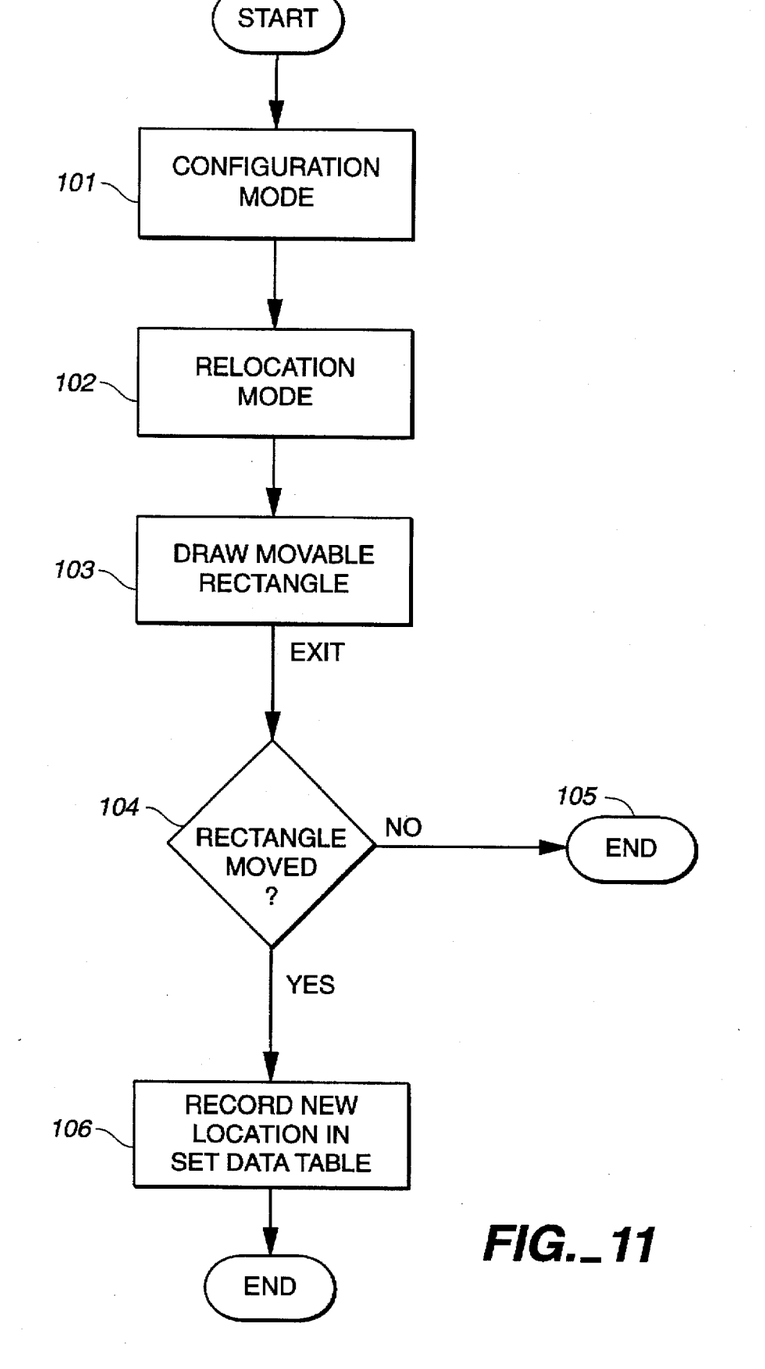
FIG. 11 is a flowchart showing the operation of relocating the portion of the screen from which a screen watch value is derived.

To accommodate this need, the preferred embodiment of the present invention allows the user to change the location of the watch spot as needed for each individual application program. This process is detailed in the flowchart in FIG. 11. To start this process, the user presses a predetermined key to enter configuration mode (Step 101), then clicks on "Relocate" 89 (FIG. 9) to enter relocation mode (Step 102). The utility program then draws a rectangle on the screen indicating the current location of the watch spot (Step 103).

Through standard mouse operation, the user drags the watch spot rectangle to any location on the screen. The user then presses a predetermined key to exit relocation mode. At this time, the utility program checks to see if the watch spot has been relocated (Step 104). If so, it records the new watch spot location in the set data table (Step 106). Since the watch spot location 46 for each application program is stored in the set data table 43 of that application program's application access file 41, a different watch spot location may be used for each application program. (FIGS. 4 and 5a)

Since the location of the watch spot is not normally visible to the user, it may be difficult for the user to determine what image is assigned to each set and what image should be assigned to each set. This knowledge is necessary in order for the user to be able to determine if mistakes have been made in the configuration, or if the watch spot location needs to change. To assist the user in recognizing the screen image at the watch spot that has been assigned to each set, when the "Assign" button 94 is selected, a picture 52 of the screen image is saved in the set data table 43 as well as the screen watch value 51. Whenever the user enters set configuration mode, the pictures 52 in the set data table are displayed next to the set names 49, as well as the picture 97 of the current screen image at the watch spot location. This provides the user with the information necessary to properly configure the set data table. (FIGS. 10a and 5a)

The x/y coordinates 34 (FIGS. 3a and 5a) stored in the hot spot data tables 29 and the x/y coordinates 46 stored in the set data table 43 are coordinates relative to a particular point on the current screen. The utility program of the present invention permits storing these coordinates relative to different locations on the screen, such as the top-left corner of the screen, the center of the screen, or the top-left corner of the current window. This information is stored as the watch spot index 47 and as an index for each of the hot spots 37. This index allows application access files 41 (FIG. 4) to be shared between computers with different size monitors. Using an index of this type is a common practice in utility programs that record hot spot locations.

It is also recognized that certain application programs display different screen images depending on the bit depth of the screen buffer memory. (Bit depth is the number of bits allocated for each pixel in the screen buffer memory.) In a very simple example of this, some programs operate with black and white pictures on a monochrome display system and color pictures on a color display system. In this situation, the screen images produce different screen watch values even though they have the same hot spot locations.

Figure 12:
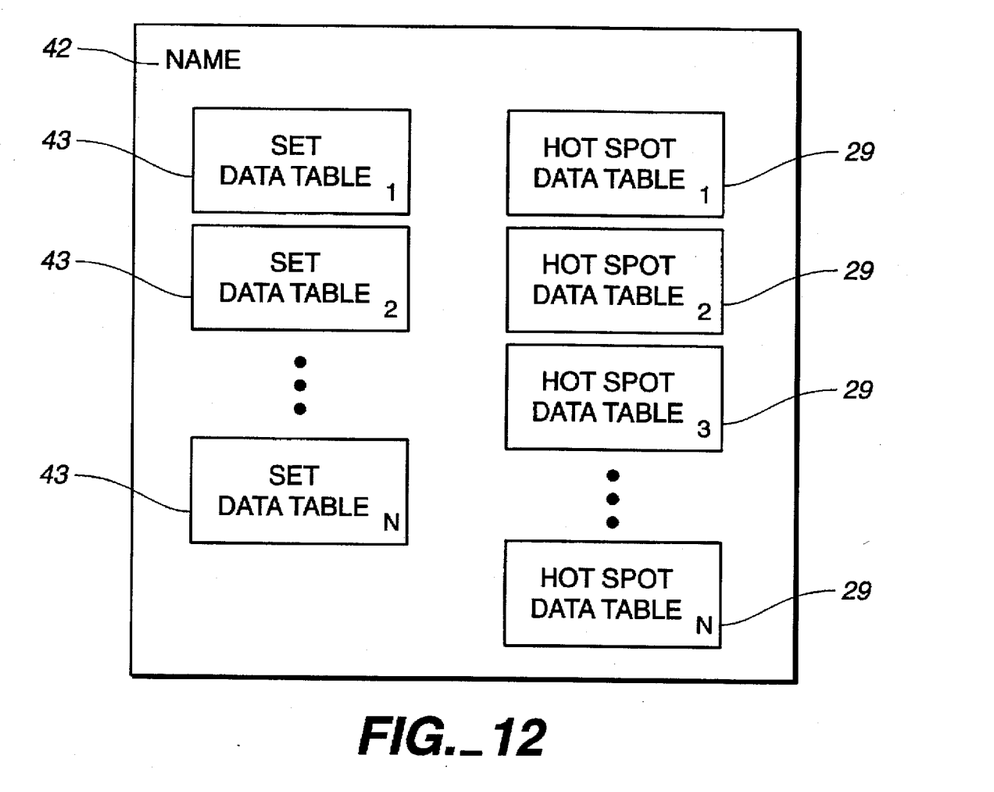
FIG. 12 is a representation of multiple set data tables corresponding to multiple bit depths.

The utility program of the present invention will readily accommodate multiple bit depths through the creation of multiple set data tables, as illustrated in FIG. 12. The utility program stores the current bit depth 53 (FIG. 5a) within the set data table 43 as the set data table is created. The utility program then creates an additional set data table 43 for each additional bit depth for which the program is adapted. During background operation, the appropriate set data table 43 is then selected based on the current bit depth setting of the screen buffer memory 18 (FIG. 1) and used for the process of changing sets as illustrated in FIG. 6. The details of this solution will be readily apparent to one skilled in the art.

The present invention concerns changing sets of configured operational features of a utility program based upon changes in the screen image of the current application program. The specific data tables and methods described above are used for purposes of explanation only and are not essential to the operation of the present invention. These tables and methods are merely illustrative of the presently preferred embodiment of the invention. Other uses of the present invention will be readily apparent to one skilled in the art after reading the detailed description of the invention and examining the accompanying illustrations.

Thus, the scope of the invention is not to be limited other than by the following claims.

We claim:

1. Apparatus for use with (1) a computer having a video display for displaying images on a screen, (2) an application program and (3) a utility program wherein the application program is capable of performing various routines and is characterized by a plurality of different screen images displayable on the screen one at a time, and the utility program is capable of performing various routines while the application program is operating and capable of maintaining a plurality of different operational feature sets configured for the different screen images of the application program, and wherein the application program is characterized by a set of selectable hot spots for each different screen image and wherein selection of a hot spot can activate an application routine, and wherein the operational feature set of the utility program is a hot spot data table recording the location of the hot spots for a particular screen image of the application program, the combination comprising:

a screen image identifier which analyzes a unique and identifiable characteristic of the application program screen images in selecting an operational feature set; and an operational feature set selector operable in response to a particular application program screen image being identified by said screen image identifier to select an operational feature set.

2. Apparatus useful with a computer having a memory and a video display for displaying images on a screen and a screen buffer memory which holds a digital representation of the image on the screen, and for use with an application program capable of performing various routines and characterized by a plurality of different screen images displayable on the screen one at a time and a set of selectable hot spots for each different screen image wherein selection of a hot spot can activate an application a routine, and a hot spot table associated with each set of selectable hot spots held in the computer memory from which it can be selected, the combination comprising:

a screen image identifier; and a hot spot table selector operable in response to a particular screen image being identified by said screen image identifier to select a hot spot table.

3. The apparatus of claim 2 wherein the particular hot spot table selected is the one associated with the image on the video display screen at the time the image is identified by said screen image identifier.

4. The apparatus of claim 3 wherein said screen image identifier samples a portion of the digitized representation of the screen image in the screen buffer memory.

5. The apparatus of claim 4 wherein the portion of the digitized representation of the screen image in the screen buffer memory sampled is the same for each different screen image of the same application program.

6. The apparatus of claim 5 wherein the portion of the digitized representation of the screen image in the screen buffer memory sampled can be different for screen images of different application programs.

7. The apparatus of claim 4 wherein said screen image identifier transforms the sampled portion of the screen buffer memory to a value that is comparable to the values of other sampled screen portions.

8. The apparatus of claim 7 wherein a different hot spot table is selected when said screen image identifier identifies the value of the screen portion sampled and the value is different than the value of the previously sampled screen portion.

9. The apparatus of claim 8 wherein each screen image of an application has a unique value to said screen image identifier.

10. The apparatus of claim 9 wherein said screen image identifier samples a portion of the digitized representation of the screen image in the screen buffer memory at a frequency of more than once a second.

11. The apparatus of claim 9 wherein the portion of the screen buffer memory sampled is less than 1% of the entire buffer memory of the screen image.

12. A method for changing sets of configured operational features in a utility program based upon changing screen images in a currently active application program being run on a computer having a video display for displaying images on a screen wherein the application program is capable of performing various routines and is characterized by a plurality of different screen images displayable on the screen one at a time, and the utility program is capable of performing various routines while the application program is operating and capable of maintaining a plurality of different operational feature sets configured for the different screen images of the application program, wherein the application program is characterized by a set of selectable hot spots for each different screen image and wherein selection of a hot spot can activate an application routine, and wherein the operational feature set of the utility program is a hot spot data table recording the location of the hot spots for a particular screen image of the application program, the steps comprising:

identifying the application program screen image wherein said screen image identification step includes analyzing a unique and identifiable characteristic of the application program screen images; and selecting an operational feature set in response to a particular application program screen image being identified.

13. The method of claim 12 wherein the particular hot spot table selected is the one associated with the image on the video display screen at the time the image is identified.

14. The method of claim 13 wherein the computer includes a screen buffer memory which holds a digital representation of the image on the screen and said step of identifying the screen image includes periodically sampling a portion of the digitized representation of the screen image in the screen buffer memory.

15. The method of claim 14 comprising the further step of:
transforming the sampled portion of the screen buffer memory to a value that is comparable to the values of other sampled screen portions.

16. The method of claim 15 comprising the further step of:
selecting a different hot spot table when the value of the screen portion sampled is different than the value of the previously sampled screen portion.

* * * * *